United States Patent [19]

Fisk

[11] Patent Number: 5,853,848
[45] Date of Patent: Dec. 29, 1998

[54] BIODEGRADABLE FOAMED PRODUCT FROM A STARCH GRAFT COPOLYMER

[75] Inventor: Donald L. Fisk, Cuba, Ill.

[73] Assignee: Uni-Star Industries, Ltd., Marion, Ark.

[21] Appl. No.: 514,449

[22] Filed: Aug. 11, 1995

Related U.S. Application Data

[63] Continuation of Ser. No. 216,414, Mar. 23, 1994, abandoned.

[51] Int. Cl.$^6$ .................................. B32B 3/00; C08J 9/06
[52] U.S. Cl. ......................... 428/143; 428/144; 428/146; 428/147; 428/305.5; 428/314.4; 428/318.4; 521/80; 521/86.1; 521/109.1; 521/149
[58] Field of Search ..................................... 428/403, 407, 428/323, 327, 143, 144, 146, 147, 305.5, 314.4, 318.4; 521/80, 86.1, 109.1, 149; 527/313

[56] References Cited

U.S. PATENT DOCUMENTS

| | | | |
|---|---|---|---|
| 3,137,592 | 6/1964 | Protzman et al. | 264/186 X |
| 3,332,897 | 7/1967 | Ray-Chaudhuri | 525/54.3 |
| 3,471,439 | 10/1969 | Bizler et al. | 523/202 |
| 3,740,362 | 6/1973 | Gaylord | 527/312 |
| 3,781,232 | 12/1973 | Gaylord | 527/312 |
| 4,026,849 | 5/1977 | Bagley et al. | 264/176 R |
| 4,863,655 | 9/1989 | Lacourse et al. | 264/53 |
| 5,035,930 | 7/1991 | Lacourse et al. | 428/35.6 |
| 5,043,196 | 8/1991 | Lacourse et al. | 428/35.6 |
| 5,095,054 | 3/1992 | Lay et al. | 524/47 |
| 5,272,181 | 12/1993 | Boehmer et al. | 521/84.1 |

FOREIGN PATENT DOCUMENTS 8302955  9/1983  WIPO .

OTHER PUBLICATIONS

A New Biodegradable Plastic Made from Starch Graft Poly (methyl Acrylate) Copolymer, Journal Applied Polymer Science, vol. 22, 459–465 (1978).

"Development of Starch Based Plastics–A Reexamination of Selected Polymer Systems in Historical Perspective" Starch/Starke 45 (1993) Nr. 8, S. 276–280.

*Primary Examiner*—H. Thi Le
*Attorney, Agent, or Firm*—Bierman, Muserlian and Lucas

[57] ABSTRACT

The biodegradable foamed product is made from a starch graft copolymer with an add-on level of about 5 to about 60%.

26 Claims, No Drawings

BIODEGRADABLE FOAMED PRODUCT FROM A STARCH GRAFT COPOLYMER

This is a continuation of application Ser. No. 216,414, filed Mar. 23, 1994, now abandoned.

This invention relates to a foamed product and, more particularly, to the use of a starch graft copolymer in making a biodegradable foamed product suitable for use as a packaging material.

Starch graft copolymers, which are recognized as being biodegradable, are a class of plastic material made from starch and a synthetic material such as a vinyl or acrylic monomer. U.S. Pat. No. 4,026,849 teaches making starch graft copolymers with a thermoplastic polymer where the percent add-on or weight percent synthetic polymer incorporated in the starch graft copolymer is about 20% to 95% by weight copolymer. The '849 patent teaches that the lower limit for percent add-on is about 30–40%. This lower limit is based on processability, and the '849 patent teaches that with suitable plasticizers the lower limit can be dropped to 20–30%. This lower limit is dictated by the amount of torque necessary to extrude or injection mold the copolymer. The '849 patent teaches that a starch graft copolymer is suitable for use as a filler with other synthetic plastics.

The lower the add-on level of the thermoplastic polymer, the more biodegradable the starch graft copolymer, see Dennenberg et al., "A New Biodegradable Plastic Made from Starch Graft Poly(methyl Acrylate) Copolymer," JOURNAL OF APPLIED POLYMER SCIENCE, Vol. 22, pp. 459–465 (1978). As can be appreciated, lower add-on levels of the synthetic material also decrease the cost for manufacture of the copolymer.

Foamed products, which are often referred to as structural foam, cellular polymer, cellular plastic, plastic foam, foamed plastic and expanded plastic, are products generally made from a plastic composition and have a cellular structure.

A major commercial use of foamed products is in the field of packaging. Styrofoam, a foamed polystyrene product, is a well-known foamed product used for packaging. Such packaging material is used to cushion and prevent damage to the contents of a package.

Conventionally, foamed products are made by fluidizing a plastic composition, forming a cellular structure by means of a blowing agent in the fluidized plastic composition, and then hardening the composition to retain the cellular structure created by the blowing agent.

Blowing agents, sometimes referred to as foaming agents, are substances that produce the cellular structure in the fluidized plastic composition. Conventional blowing agents include fluorocarbons, nitrogen gas, hydrazine derivatives, trihydrazide triazine, 5-phenyl tetrazole, p-toluene sulfonyl semicarbazide, modified azodicarbonamide, and azodicarbonamide. Chemical blowing agents are a class of blowing agents which are solids or liquids at room temperature and, upon heating, release a gas. Typically, they are employed by mixing the chemical blowing agent with the solid plastic material and heating the mixture while maintaining the mix under pressure. Heating fluidizes the plastic material and causes the blowing agents to release a gas. The gas forms bubbles or cells in the fluid plastic material. The mixture is maintained under pressure until it is placed into a mold where the gas expands and in turn causes the fluid plastic material to expand. Upon solidifying, the cell structure remains. Different blowing agents release gas at different temperatures and the choice of blowing agent depends on the processing conditions, plastic material and the size of the desired gas cells.

Chemical blowing agents have the advantage over gaseous blowing agents in that they can be added to the solid plastic material prior to heating. Gaseous blowing agents such as nitrogen and some fluorocarbons must be injected into the already fluidized plastic material.

Packaging materials made from synthetic polymers, such as polystyrene, have come under attack due to their non-biodegradable nature. With mounting pressure on manufacturers to produce a biodegradable product, more and more manufacturers are seeking alternative sources for conventional synthetic polymers. Natural polymers such as cellulose and starch have been the main contenders as replacements for the synthetic polymers.

It has been suggested to use starch and modified starch to make foamed products. For example, U.S. Pat. No. 3,137,592 teaches extruding starch with a plasticizer, preferably water, such that the plasticizer flashes as the fluidized starch exits the die of the extruder. The flashing of the plasticizer causes puffing or expanding of the fluidized starch and the formation of a porous mass. The amount of plasticizer ranges from 22% to 67% based on the dry weight of starch. The temperature during extrusion ranges from 125° C. to 250° C. with a working temperature range of 150° C. to 160° C.

International Application Publication No. WO83/02955 teaches making a foamed starch product by extruding a composition of starch with a moisture content of 12–20% by weight starch with a gas forming or gas generating agent (blowing agent) at a temperature of 60°–220° C. Such an expanded starch product is taught as being useful as a packaging material to replace polystyrene foam or as a snack food if mixed with flavorings and the like. Potato starch is used in the example to produce the foamed product.

U.S. Pat. Nos. 4,863,655; 5,035,930; and 5,043,196 teach making a biodegradable foamed packaging material from a high amylose starch. These patents teach that the foamed packaging material is prepared by extruding high amylose starch having a moisture content of 10% to 21% by weight at a temperature of 150° C. to 250° C. According to these patents, both unmodified and modified starch can be used to make the packaging material. The types of modified starches taught by these patents are esterified, etherified, oxidated, crosslinked, enzyme converted and acid hydrolyzed. The etherified high amylose starches, and specifically hydroxypropylated high amylose starch, are the main focus of these patents.

Although packaging material made with starch is biodegradable, it has been found that unmodified starch, specifically unmodified high amylose starch, does not produce a good foamed product. While use of a modified starch, specifically a hydroxypropylated high amylose starch, is able to produce an acceptable foamed product, the product will easily flake when subjected to shear forces. There is a need for a biodegradable packaging material which has good structural stability and toughness and has characteristics closer to foamed synthetic polymers.

It has now been discovered that a good foamed product can be made by using a starch graft copolymer as the plastic component. It has been found that a foamed product made from a starch graft copolymer has good structural stability and toughness while still being biodegradable. In fact, the foamed product of the present invention has been found to more closely resemble a foamed product made from synthetic material than the foamed products made from starch components used heretofore.

Broadly, the present invention comprises making a foamed packaging material by extruding a starch graft copolymer having an add-on level of about 5% to about 60% by weight in the presence of a blowing agent at a temperature of about 100° C. to about 250° C. and a moisture content of about 10% to about 20% by weight dry copolymer, thereby fluidizing said starch graft copolymer and causing said fluidized starch graft copolymer to expand and form cells therein; and cooling said expanded starch graft copolymer to form a solid matrix of starch graft copolymer with cells therein.

The add-on level is preferably about 10 to about 50 weight percent by weight copolymer and, more preferably, about 10 weight percent to about 40 weight percent by weight copolymer. Although a foamed product can be made in accordance with the present invention with a starch graft copolymer that has an add-on level above about 60 weight percent by weight, such a product has poor biodegradability characteristics. It has also been found that a foamed product can be made with a starch graft copolymer having an add-on level below about 10%; however, such a material does not have the rigidity and toughness of the material made with a higher add-on level and, thus, it is preferred that the add-on level be about 10% and above. It has also been found that a foamed product can be made from a starch graft copolymer using water instead of a blowing agent; however, the product has non-uniform cells and is an unacceptable commercial foamed product.

One of the novel features of the foamed product made in accordance with the present invention is that, at add-on levels of about 50% to about 60%, it has been found that this material will absorb hydrocarbon materials, such as oil and gasoline, without the starch graft copolymer breaking down. This makes the foamed product of the present invention suitable for use as a packaging material with hydrocarbon containers where there is the possibility of spillage or leakage from the container as well as a packaging material for use in booms and pillows used to absorb contaminants, such as oil from water.

The foamed product of the present invention is especially suitable as a packaging material to replace foamed polystyrene because it has properties more similar to foamed polystyrene than other foamed modified and unmodified starch products. Specifically, the foamed starch graft copolymer of the present invention is readily moldable in injection molding machines to produce a solid molded packaging material used to securely hold a product inside a container.

The product of the present invention has been found to have good stability even when subject to the heat and moisture often associated with shipping goods to different parts of the world. This is especially true at the higher add-on levels of about 20% to about 60%.

Another novel aspect of the present invention is that at the lower add-on levels, about 5% to about 20%, a more processable starch graft copolymer is made. The reason for the processability of the starch graft copolymer at lower add-on levels is not completely understood. It is thought that such a lower level of add-on is able to be successfully processed through an extruder without excessive torque because the material of the present invention has a lower glass transition and gelatinization temperature.

The term "add-on level" as used in the specification and claims means the amount by weight of synthetic monomer present in the copolymer based on the total weight of the copolymer.

The starch used to make the starch graft copolymer of the present invention is a granular starch and, specifically, is selected from the group consisting of common starch, aedu starch, hydroxypropylated common starch, high amylose starch, hydroxypropylated high amylose starch, and blends thereof. In all cases, the starch used to make the starch graft copolymer of the present invention is a granular starch, i.e. not gelatinized.

Any source of starch can be employed in the present invention. Suitable sources include maize, sorghum, wheat, potato, barley, tapioca and rice. The preferred source is maize. Common starch means that the starch has an apparent amylose content of about 20% to about 40% while high amylose starch means that the starch has an apparent amylose content of greater than about 50% and has the double recessive genes amylose extender or the dominant gene amylose extender. Common starch and high amylose starch are conventional terms well-known to those of skill in the art. Generally, these terms are used to distinguish the starch over a waxy starch which is considered to have little or no amylose.

Preferably, the granular high amylose starch has an apparent amylose content, as measured spectrophotometrically with iodine, of about 50% to about 80% and, more preferably, is about 50% to about 70%. Good results have been obtained with commercial high amylose starch having an amylose content of about 50% to about 70%.

The granular common starch can be either dried or prime starch. Prime granular starch is undried starch in slurry form as it is obtained from a wet milling process before drying. The preferred source of both the dried and prime starch is maize. Extraction of starch from corn kernels is a well-known process. Conventionally, in a wet milling operation the kernels are added to water and ground through a multi-step process wherein the gluten, oil and hull are separated from the starch component. The resulting starch component, in an aqueous slurry, is subjected to dewatering and then a drying step. After drying, the moisture content of the starch is typically 5% to 10% by weight. The term prime starch as used herein means starch in either slurry form or cake form which is dewatered but not dried.

The aedu starch employed in this invention may be obtained from a starch bearing plant with an amylose extender dull (aedu) homozygous genotype. The term aedu starch means not only starch obtained from a starch bearing plant that has an aedu homozygous genotype aeaedudu but also translocations, inversions and other variants that contain or that can be described as containing the aedu genotype. The amylose extender (ae) gene had been available only as a recessive gene. U.S. Pat. No. 5,004,864, however, discloses the discovery of a dominant amylose extender (AE) gene. Those of skill in the art will recognize that the dominant amylose extender gene may be used to obtain aedu starch.

The use of an aedu starch in food is disclosed in U.S. Pat. No. 4,790,997 issued Dec. 13, 1988. In that patent, the aedu starch is taught as an additive to canned foods to act as a thin-thick starch additive.

The degree of substitution (DS) of the granular hydroxypropylated high amylose starch used in the present invention is about 0.01 to about 0.24. The degree of substitution is the number of hydroxypropyl groups per anhydroglucose units (AGU). More preferred, the hydroxypropylated high amylose starch for use in the present invention has a DS of about 0.1 to about 0.18. Good results have been obtained with a hydroxypropylated high amylose starch having an apparent amylose content of about 50% and a DS of about 0.16 and with a hydroxypropylated high amylose starch having an apparent amylose content of about 70% and a DS of about 0.19.

Suitably, the granular hydroxypropylated common starch for use in the present invention has a DS of about 0.5 to about 0.25. More preferably, the hydroxypropylated common starch has a DS of about 0.7 to about 0.15. Good results have been obtained with a hydroxypropylated common starch having a DS of about 0.9 to about 0.12.

The granular hydroxypropylated starch of the present invention, either common or high amylose, is made in a conventional manner. Typically, a slurry of starch is treated with an alkali, such as sodium hydroxide, and propylene oxide is added to the slurry to form the product. It has been found that a hydroxypropylated high amylose starch made in accordance with U.S. Pat. No. 4,981,709 is a good source of hydroxypropylated high amylose starch having an apparent amylose content of about 50%.

Starch graft copolymers are made by grafting a monomer onto the granular starch. Suitable monomers include styrene, methyl methacrylate, methylacrylate, butylacrylate, butadiene, isoprene and combinations thereof. Preferably, methylacrylate, butylacrylate and blends of methylacrylate and butylacrylate are used as the monomer.

Many methods are known for the initiation of graft polymerization, e.g., ceric ion, cobalt-60 irradiation, electron beam irradiation, ozone, ferrous ion-peroxide, or other redox systems; and any of these known methods will yield the 5 composite compositions of the instant invention. Good results have been obtained with a ceric ion as the initiator.

When using the ceric ion as an initiator, it has been found that ceric ammonium nitrate is a good source of ceric ion. Preferably, the ceric ammonium nitrate is added proportionally over a period of time by means of a solution of nitric acid wherein the ceric ammonium nitrate has been dissolved.

The grafting reaction is conducted in a conventional manner using conventional equipment to produce a starch graft copolymer for use in the present invention. A suitable method for making the starch graft copolymer for use in the present invention is to form an aqueous slurry of the granular starch to a Baume of about 5 to about 20, preferably about 15 Be. The water used to make the slurry is distilled or de-ionized. In order to remove dissolved oxygen, a nitrogen purge is used for about 30 minutes. Alternatively, some other method, such as a vacuum, is used to remove the oxygen from the water.

During the oxygen removal step, the slurry is maintained at a temperature of about 20° C. to about 40° C. The temperature of the slurry throughout the reaction is maintained below the gelatinization temperature of the starch and, generally, below about 60° C.

Next, the monomer is added to the deoxygenated slurry. The purge/vacuum no longer needs to be maintained; however, oxygen should not be introduced into the reaction vessel and the reaction vessel should be sealed to maintain the deoxygenated environment. The monomer is stirred into the slurry so as to uniformly distribute it throughout the slurry. The amount of monomer added is calculated in a conventional manner so as to provide an add-on level in accordance with the present invention.

Next, the pH of the slurry is adjusted to under 3.0 to obtain the maximum grafting efficiency. Good results have been obtained by using nitric acid to adjust the pH. The pH adjustment can be done at any time prior to or during the addition of the initiator. Preferably, the pH of the water is adjusted to below 4.5 prior to the addition of the starch to the water.

Next, an initiator of ceric ammonium nitrate is added in a dilute (0.1 to 1.0N, preferably 0.5N) nitric acid solution over a period of about one-half hour. Good results have been obtained using a ratio of about one mole of ceric ammonium nitrate to about 50 to about 250 AGU of starch.

The reaction is allowed to proceed for a period of time to obtain the add-on level of polymer in accordance with the present invention.

Finally, the reaction mixture is neutralized and filtered and the resulting starch graft copolymer is dried.

In order to increase the grafting efficiency, the monomer is added after the addition of the initiator rather than before. By adding the monomer after the initiator, the grafting efficiency can be increased by as much as about 20%. When adding the monomer after the initiator, there is a limited amount of time from when the initiator is added to when the monomer has to be added. The initiator, and especially ceric ammonium nitrate, is a strong oxidizer and in the acid environment will soon start to break down the starch. The maximum length of time between addition of the initiator and the monomer will vary and can readily be determined by one of skill in the art.

When adding the initiator before the monomer, it is essential that the initiator be uniformly dispersed throughout the starch slurry and that the monomer be added shortly after the addition of the initiator. The mixing of the initiator should take less than a quarter of an hour and preferably no more than about 5 to 15 minutes. As soon as the initiator is thoroughly mixed into solution, the monomer is added and thoroughly mixed into the solution.

Preferably, prime starch, from a starch processing plant, is used in the grafting process. It is believed that the prime starch granules are more accessible to reaction and processing since they have been maintained in their original hydrated state. Using prime starch decreases the amount of water added into the process and shortens the degassing step. The reaction proceeds in the same manner as with conventional dried starch. Filtration of the grafted prime starch product has revealed that the product produces a finer powder than conventional starch products after drying and sifting. The prime starch should have a water content of above about 14%.

When utilizing prime starch to make the starch graft copolymer, it has been observed that the resulting starch graft copolymer has a different behavior than a starch graft copolymer made with a dried starch obtained from a conventional wet milling process. These differences are: (a) the starch graft copolymer made from prime starch has a smoother, more uniform slurry with much less free water than the starch graft copolymer made from conventional dried, reslurried starch; (b) it requires more energy to dewater the slurry of starch graft copolymer made from prime starch as compared to the starch graft copolymer made from conventional dried, reslurried starch; (c) the starch graft copolymer made from prime starch tends to gelatinize at a much lower temperature than the starch graft copolymer made from conventional dried, reslurried starch; and (d) less extruder torque is needed to process the starch graft copolymer made from prime starch than the same formulation of starch graft copolymer made from conventional dried, reslurried starch.

In order to make the foamed product in accordance with the present invention, a conventional method using conventional equipment is employed. Suitably, the copolymer is extruded into a foamed product using a single screw or twin screw extruder. Additionally, a conventional injection molding operation can be employed to make the foamed product in accordance with the present invention.

Where a chemical blowing agent is used, the chemical blowing agent is mixed with the starch graft copolymer and then the admixture is extruded. Where a gaseous blowing agent is used, the gas is mixed with the fluid starch graft copolymer at the nozzle of the extruder. Such mixing is conducted in a conventional manner.

The amount of chemical blowing agent used in the present invention is about 0.1% to about 1.5% by weight dry copolymer and, more preferably, about 0.3% to about 0.6% by weight copolymer.

The blowing agent used in the present invention must be compatible with the temperature used during extrusion, about 100° C. to about 250° C. Suitable blowing agents include azodinitriles, azodicarbonamides and gases such as carbon dioxide, nitrogen, helium and air.

The foamed product made in accordance with the present invention has a bulk density of less than about 2.0 pounds per cubic foot.

In forming a foamed product in accordance with the present invention, not all of the biodegradable material used to make the foamed product need be the starch graft copolymer of the present invention. Specifically, it has been found that mixtures, such as 25% starch graft copolymer and 75% common wheat starch, produce a good biodegradable foamed product.

These and other aspects of the present invention may be more fully understood by reference to the following examples:

EXAMPLE 1

This example illustrates making a starch graft copolymer in accordance with the present invention. Different starches as identified in Table 1 below were used. Also, the amount of polymer add-on is listed in Table 1 below.

In order to make the starch graft copolymer of the present invention as listed in Table 1 below, the respective starches are suspended in distilled or de-ionized water and stirred under nitrogen gas purge or under vacuum for up to 30 minutes to remove dissolved oxygen from the starch suspension. This process softens the starch granules, making the grafting process possible. The reaction temperature was maintained between 75° F. (25°C.) and 105° F. (40°C.). The thermoplastic monomer, methyl acrylate, was added to the starch suspension and stirred for 5 to 20 minutes without nitrogen purge or additional vacuum. The pH of the starch suspension was monitored and nitric acid solution was added to attain a reaction mixture pH under 2.0 for maximum grafting efficiency. The initiator, usually ceric ammonium nitrate (CAN), is added to a dilute (0.1N to 1N) nitric acid solution at a level of one mole of CAN to 50 to 250 AGU of the starch. The initiator was then introduced proportionally over a 30-minute period. After the initiator addition was completed, the reaction was allowed to proceed for 30 to 60 minutes. Sodium hydroxide, in a 1 to 5N solution, was added to the reaction mixture until a pH of 6.5 to 7.5 was attained. The reaction product was filtered and dried to a moisture content of about 15%.

TABLE 1

| Sample | Starch | Polymer | Add-on Level (%) |
| --- | --- | --- | --- |
| 1 | HPHA-50% | MA | 12.1 |
| 2 | Common | BA | 13.4 |
| 3 | HPHA-50% | MA | 10.7 |
| 4 | HP Common | MA | 9.6 |
| 5 | HPHA-70% | MA | 9.7 |
| 6 | Prime Common | MA | 10.8 |
| 7 | aedu | MA | 10.3 |
| 8 | Common/aedu | MA | 11.5 |
| 9 | Common/aedu | BA | 13.6 |

Each of the starches used in this example were obtained from maize. The terms and abbreviations used in Table 1 are as follows:

(1) HPHA-50% stands for a hydroxypropylated high amylose starch having an apparent amylose content of about 50% and a degree of substitution of about 0.155;

(2) HP Common stands for a hydroxypropylated common starch having a degree of substitution of about 0.11;

(3) HPHA-70% stands for a hydroxypropylated high amylose starch having an apparent amylose content of 70% and a degree of substitution of about 0.18.

(4) Prime Common stands for a common starch (28% apparent amylose) obtained directly from a corn wet milling operation which has not been subjected to a drying step;

(5) Common/aedu stands for a mix of common and aedu starch in a weight ratio of 50:50 which was first mixed and then reacted with the synthetic monomer;

(6) MA stands for methyl acrylate; and (7) BA stands for butyl acrylate.

EXAMPLE 2

This example illustrates making a foamed product in accordance with the present invention.

Formulations of the starch graft copolymers identified in Table 2 below were extruded through a Haake Buchler HBI System 90 torque rheometer equipped with a single screw extruder. The barrel temperatures during extrusion were 140° C.–150° C.–160° C. (Feed to Die) and the screw was run at 125 rpm.

Each formulation contained 0.6% by weight of a blowing agent, activated azodicarbonamide sold under the name Celogen 754 by Uniroyal. Formulation #2, in Table 2 below, also contained 1% of a processing aid, octoglycerol monooleate, sold under the name Santone 8-1-0 by Van Der Bergh Food Ingredient Group. Formulation #3, in Table 2 below, also contained 4% of a processing aid, polyglycerol ester. Each of the starch graft copolymers were made in accordance with Example 1 above. Methyl acrylate was used to make the copolymer. The specific add-on level is reported in Table 2 below.

TABLE 2

| Formulation | Starch | Add-on Level (%) | Moisture Content (%) |
| --- | --- | --- | --- |
| 1 | Common/aedu | 10 | 17 |
| 2 | Common/aedu | 10 | 17 |
| 3 | Common | 20 | 15 |
| 4 | Common | 20 | 15 |
| 5 | HPHA-70% | 10 | 16 |
| 6 | Common/HPHA-50% | 10 | 16 |

Each starch used in this example was obtained from maize. Each of the terms and abbreviations used for formulations 1–5 in Table 2 above are the same as the abbreviations used in Example 1. The term Common/HPHA-50% (formulation 6) stands for a 50:50 by weight mix of a common starch (28% apparent amylose) and a hydroxypropylated high amylose starch having an apparent amylose content of about 50% and a DS of about 0.155. First, the two starches were mixed and then the grafting reaction was carried out. The moisture content was that of the copolymer prior to extrusion.

As known by those of skill in the art, the use of processing agents for an extrusion is dictated by the type of equipment used, e.g. single screw vs. double screw, as well as the quality of the end product. A foamed product in accordance with the present invention can also be made without the use of processing aids.

EXAMPLE 3

The foamed products formed in Example 2 were extruded into flat sheets and tested for cushioning and durability. Each one was found to be durable and provide cushioning comparable to conventional foamed products made out of synthetic materials.

EXAMPLE 4

This example illustrates using the foamed product made in accordance with the present invention to absorb liquid hydrocarbons.

A foamed product is made in accordance with Example 2 and shaped into a conventional "peanut" style product. The "peanut" shaped foamed product of the present invention is then packed into a boom made of nylon netting. The peanut packed boom is then floated on top of the water where the water has a hydrocarbon, such as gasoline, floating on top. The gasoline is absorbed by the peanut made in accordance with the present invention.

EXAMPLE 5

This example illustrates using the foamed product made in accordance with the present invention for absorbing liquid hydrocarbon.

A foamed product made in accordance with Example 2 is shaped into a "peanut" form. At a site where oil has spilled from a 55-gallon drum onto the ground, handfulls of the foamed peanut of the present invention are tossed on top of the oil and a broom is used to stir the peanuts into the oil. In this manner, the oil is absorbed by the peanuts of the present invention.

It will be understood that the claims are intended to cover all changes and modifications of the preferred embodiments of the invention herein chosen for the purpose of illustration which do not constitute a departure from the spirit and scope of the invention.

What is claimed is:

1. A biodegradable foamed product consisting essentially of an expanded starch craft copolymer having a closed cell structure, said starch graft copolymer prior to expansion being a granular starch onto which has been grafted a thermoplastic polymer selected from the group consisting of poly(methyl acrylate), poly(butyl acrylate), poly(styrene), poly(methyl methacrylate), and blends thereof wherein the thermoplastic polymer is present in an amount of about 5 to about 60 weight percent by weight of copolymer, said foamed product having a closed cell structure making said product suitable as a packaging material.

2. The biodegradable foamed product of claim 1 wherein the granular starch is common starch, aedu starch, high amylose starch having an amylose content of greater than about 50 weight percent, hydroxypropylated common starch, hydroxypropylated high amylose starch having an amylose content of greater than about 50 weight percent, or blends thereof.

3. The biodegradable foamed product of claim 2 wherein the common starch is prime common starch.

4. The biodegradable foamed product of claim 3 wherein the prime common starch is in slurry form.

5. The biodegradable foamed product of claim 1 wherein the source of the starch is maize, sorghum, wheat, rice, barley or tapioca.

6. The biodegradable foamed product of claim 1 wherein the polymer is present in an amount of about 10 to about 50 weight percent by weight of copolymer.

7. The biodegradable foamed product of claim 1 wherein said foamed product has a bulk density of less than 2.0 pounds per cubic foot.

8. A composition suitable for extruding into a biodegradable foamed product, consisting essentially of:
a starch graft copolymer made from a granular starch onto which has been grafted a thermoplastic polymer selected from the group consisting of poly(methyl acrylate), poly (butyl acrylate), poly(styrene), poly(methyl methacrylate) and blends thereof wherein the thermoplastic polymer is present in an amount of about 5 to about 60 weight percent by weight copolymer; and a chemical blowing agent in an amount of about 0.1 to about 1.5 weight percent of copolymer, said chemical blowing agent being compatible with the temperature used during extrusion, said temperature being about 100° C. to about 250° C.

9. The composition of claim 8 wherein water is used as said chemical blowing agent.

10. The composition of claim 8 further consisting of a processing aid.

11. A foamed product made from the composition of claim 8.

12. A method for making a foamed product comprising the steps of:
(a) forming a composition in accordance with claim 6; and
(b) extruding said composition into a foamed product.

13. A method for using a starch graft copolymer to make a foamed product comprising the steps of:
(a) forming a composition consisting essentially of a starch graft copolymer and a blowing agent, said starch graft copolymer being a granular starch onto which has been grafted a thermoplastic polymer selected from the group consisting of poly(methyl acrylate), poly(butyl acrylate), poly(styrene), poly(methyl methacrylate) and blends thereof wherein the thermoplastic polymer is present in an amount of about 5 to about 60 weight percent by weight of copolymer;
(b) heating the composition of starch graft copolymer and blowing agent to form a fluid mix and to form cells in said fluid mix; and
(c) solidifying said fluid mix to form a solid foamed product.

14. The method of claim 13 wherein the granular starch is common starch, aedu starch, high amylose starch having an amylose content of greater than about 50 weight percent, hydroxypropylated common starch, hydroxypropylated high amylose starch having an amylose content of greater than about 50 weight percent, or blends thereof.

15. The method of claim 14 wherein the common starch is prime common starch.

16. The method of claim 13 wherein the source of the starch is maize, sorghum, wheat, rice, barley or tapioca.

17. The method of claim 13 wherein the amount of polymer is about 10 to about 50 weight percent by weight of copolymer.

18. The method of claim 13 wherein the amount of polymer is about 5 to about 20%.

19. A method for using a starch graft copolymer as a foamed product for absorbing hydrocarbons comprising the steps of:
(a) forming a composition consisting essentially of a starch graft copolymer and a blowing agent, said starch graft copolymer being a granular starch onto which has been grafted a thermoplastic polymer selected from the group consisting of poly(methyl acrylate), poly(butyl acrylate), poly(styrene), poly(methyl methacrylate), and blends thereof wherein the thermoplastic polymer is present in an amount of about 5 to about 60 weight percent by weight of copolymer;

(b) heating the composition of starch graft copolymer and blowing agent to form a fluid mix and to form cells in said fluid mix; and (c) solidifying said fluid mix to form a solid foamed product.

20. The method of claim 19 wherein the granular starch is common starch, aedu starch, high amylose starch having an amylose content of greater than about 50 weight percent, hydroxypropylated common starch, hydroxypropylated high amylose starch having an amylose content of greater than about 50 weight percent, or blends thereof.

21. In a process for making a starch graft copolymer, wherein starch is reacted with a thermoplastic polymer, the improvement comprising using a granular prime starch and said thermoplastic polymer being selected from the group consisting of poly(methyl acrylate), poly(butyl acrylate), poly(styrene), poly(methyl methacrylate), and blends thereof, the thermoplastic polymer being present in an amount of about 5 to about 60 weight percent by weight of copolymer.

22. The process of claim 21 wherein the source of the prime starch is maize, sorghum, wheat, potato, barley, tapioca or rice.

23. The process of claim 21 wherein the thermoplastic polymer is butadiene, isoprene or combinations thereof.

24. A biodegradable foamed product comprising a granular prime starch onto which has been grafted a thermoplastic polymer selected from the group consisting of poly(methyl acrylate), poly(butyl acrylate), poly(styrene), poly(methyl methacrylate), and blends thereof wherein the thermoplastic polymer is present in an amount of about 5 to about 60 weight percent by weight of copolymer, said foamed product having a closed cell structure making said product suitable as a packaging material.

25. The biodegradable foamed product of claim 24 wherein the granular prime starch is common starch, aedu starch, high amylose starch having an amylose content of greater than about 50 weight percent, hydroxypropylated common starch, hydroxypropylated high amylose starch having an amylose content of greater than about 50 weight percent, or blends thereof.

26. A method for using a starch graft copolymer to make a foamed product comprising the steps of:

(a) forming a composition comprising a starch graft copolymer and a blowing agent, said starch graft copolymer being made from a prime starch and a thermoplastic polymer selected from the group consisting of poly(methyl acrylate), poly(butyl acrylate, poly(styrene), poly(methyl methacrylate), and blends thereof, the thermoplastic polymer being present in an amount of about 5 to about 60 weight percent by weight of copolymer;

(b) heating the composition of starch graft copolymer and blowing agent to form a fluid mix and to form cells in said fluid mix; and (c) solidifying said fluid mix to form a solid foamed product.

* * * * *

UNITED STATES PATENT AND TRADEMARK OFFICE
CERTIFICATE OF CORRECTION

PATENT NO. : 5,853,848
DATED : December 29, 1998
INVENTOR(S) : Donald L. Fisk

It is certified that error appears in the above-indentified patent and that said Letters Patent is hereby corrected as shown below:

Column 9, line 41 (claim 1), change "craft" to --graft--.

Column 10, line 26 (claim 12), change "6" to --8--.

Signed and Sealed this

Twenty-fifth Day of May, 1999

Attest:

Q. TODD DICKINSON

Attesting Officer     Acting Commissioner of Patents and Trademarks